May 28, 1963     B. G. REIMERS     3,091,049

FISH LURE

Filed Sept. 29, 1958

INVENTOR.
BEN G. REIMERS
BY
Horace B. Van Valkenburgh
ATTORNEY 3,091,049
FISH LURE
Ben G. Reimers, 2826 11th St., Boulder, Colo.
Filed Sept. 29, 1958, Ser. No. 764,060
5 Claims. (Cl. 43—42.31)

This invention relates to fish lures, and more particularly to fish lures of a type which may be moved through water so as to cause noise and vibration.

Several ways of constructing fish lures have been proposed so that as the lure is moved through the water it will tend to produce noise and may also vibrate in order to attract fish. In general, such constructions have comprised a bulky, hollow body sometimes fish-like in appearance, containing shiftable or loose material within a chamber therein. However, lures in general are smaller and not constructed so as to receive material for causing noise and vibration. For example, the most popular type of lure is formed of a curved or flat plate, generally metallic, wherein primary reliance is placed on the appearance and natural movement of the lure to attract fish, combined with some other means, such as a smaller spinner for attracting fish. Fishermen wish to have as much opportunity as possible to attract and catch fish, with any lure, but usually do not wish to use a lure which departs radically from the more popular lures.

Among the objects of this invention are to provide a novel noise and vibration producing device; to provide such a device which is particularly adapted to be incorporated in a conventional fish lure; to provide a novel fish lure which includes such a noise and vibration producing device; to provide such a device which is both easily and securely attachable to and detachable from the lure; to provide such a lure in which the noise and vibration producing device may be assembled therewith during manufacture, or may be quickly and easily assembled therewith by the fisherman; to provide such a fish lure in which provision is made for attachment in a unique manner of a member so constructed and arranged as to loosely contain material therewithin, so as to cause noise and to produce vibration when the lure shifts as it is moved through the water; to provide such a lure, the normal operation of which is not unduly affected by removal of the noise and vibration producing device; and to provide such a lure and noise and vibration producing device which is simple to construct and economical to manufacture.

Additional objects of this invention, together with the novel features thereof, will become apparent from the following description, taken in connection with the accompanying drawing, in which.

Figure 1:
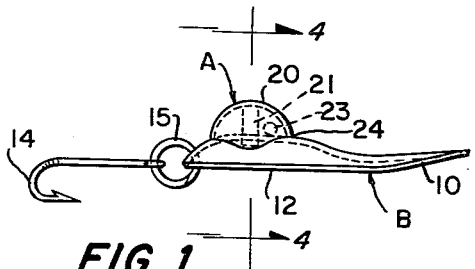
FIG. 1 is a side elevation of a fish lure constructed in accordance with the present invention and forming one embodiment thereof.
Figure 2:
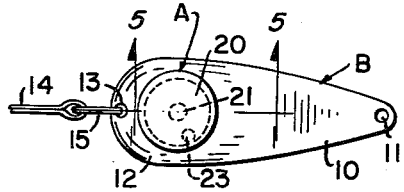
FIG. 2 is a top plan view of the fish lure of FIG. 1.
Figure 3:
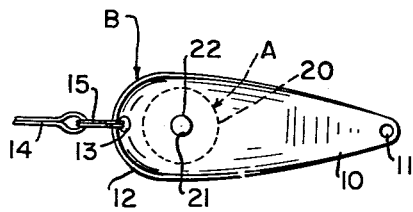
FIG. 3 is a bottom plan view of the fish lure of FIG. 1.
Figure 4:
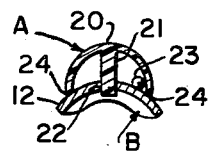
FIG. 4 is a cross section taken along line 4—4 of FIG. 1.
Figure 5:
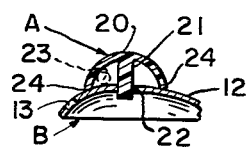
FIG. 5 is a fragmentary longitudinal section taken along lines 5—5 of FIG. 2.

With more particular reference to the drawings, there is illustrated in FIGS. 1–5 a fish lure including a body B of conventional generally spoon-shaped configuration, body B having a leading, upturned convex portion 10, adapted to receive the end of a fish line through a hole 11, and a trailing, elongated convex portion 12 provided with a hole 13 of limited size at its trailing edge for attachment of a single hook 14 or cluster of hooks, as by a ring 15. The fish lure body B, as described, is of conventional construction, being composed preferably of metal and designed in general shape and appearance to attract the fish. Usually lures of this type will undergo a shifting movement as they are pulled through the water and may tend to alternately dip and return to the surface as they are manipulated by the operator.

A principal feature of the present invention is an attachment A which is adapted for attachment preferably to the trailing portion 12 of the body B. The primary purpose of the attachment A is to produce in combination with the movement of body B, noise and vibration as the lure is moved through the water. The attachment A further is adapted for easy and secure attachment to the body B, yet quickly detachable therefrom, so as to permit use of the noise and vibration producing attachment A only when desired. To this end, the attachment A includes a hollow shell or dome 20, preferably of streamlined hemispherical shape for ease of movement through the water, and a stem 21 through which the attachment is mounted securely on the body B by the stem 21 extending through a hole 22 in the body B. Hole 22 is conveniently located at the apex of the trailing portion 12 and is dimensioned in relation to the stem 21 so that the stem must be forced through the opening for tight fitting engagement with the edge thereof. In turn, dome 20 forms an annular space around the stem to permit disposition of one or more shiftable or loose particles therein, such as ball 23. Buckshot is conveniently used as the shiftable material because the shot, being round, will tend to be in a state of continuous movement, and is readily available.

The peripheral edge or rim 24 of the dome 20 is shaped so as to conform substantially to the contour of the surface of the trailing portion 12 surrounding the hole 22. In this connection, it will be noted that it is not necessary to form a water tight joint between the dome edge 24 and the surface of the trailing portion, since it is necessary only to bring the surfaces close enough together to prevent accidental loss of the loose particles, such as ball 23, contained within the dome.

The dome 20 and the stem 21 are preferably integral, while the attachment A is conveniently formed of a material, such as polyethylene or a similar plastic, which is light in weight, easily shaped and possesses some degree of resiliency. The attachment A may be transparent or translucent, or may have any desired color. The stem 21 has a length so as to extend a limited distance through the hole 22 and has sufficient resiliency that the end will tend to return to its original size after it has been pushed through the hole 22, so as to hold the attachment more securely in position. For assembly of the attachment A to the body B, it is necessary only to place the ball 23 within the dome, with the attachment A upside down from the position shown in FIG. 1 and the body B above, align the rim 24 of the dome with the corresponding contour of the body and the stem 21 with the hole 22, then push the dome upwardly to push the stem into the hole 22. When it is desired to remove the attachment, it is necessary only to exert outward pressure on the end of the stem from the underside of the body B, to move the end of the stem through the opening for release. Or, the rim 24 of the dome may be pried away from the body B, as by a knife blade or other suitable instrument. In this manner, the attachment A may be assembled to the body either in manufacturing or by the fisherman himself. It will be noted that the body B may be formed in the conventional manner and that the only additional operation is to form the hole 22 therein, which may be formed in the same manner as the fish line hole 11 and the hook attachment hole 13, as by punching, drilling, or the like. Also, the attachment A may be formed by molding, or in any other suitable manner. Of course, other suitable means of attachment may be provided for interconnection of the attachment A and the body B. It will be understood, however, that the mode of attachment described is considered especially unique in the way in which it permits ease of attachment and detachment yet holds the dome 20 securely in position.

When the lure with the attachment A is retrieved after casting, the ball 23 will roll around the annular space within the dome and in addition strike against the surface of the dome 20 and particularly the body B, as the body normally shifts during movement through the water. The movement of the ball in turn will produce a noise or vibration which travels through the water and, as will be evident, the noise and vibration may be increased, if desired, by pulling the lure in a series of jerking movements.

The placement of the dome together with the contained particles on the trailing portion of the lure acts as a stabilizer in maintaining the lure in the proper upright position and, in addition, enables better casting by the fisherman in throwing or looping the lure out into the water. Moreover, it is possible that appearance of the attachment A, in combination with the lure, provides additional attraction to the fish. In this connection, it will be evident that the attachment may be of any shape and may extend for a greater proportion of the length and width of body B if desired, although the construction shown has been found to be entirely suitable in carrying out the principles of the present invention, especially since the attachment is small and light in weight so as to permit the desired action of the conventional lure, yet is an added attraction in the manner in which it causes noise and vibration.

Figure 6:
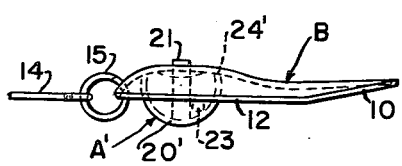
FIG. 6 is a side elevation of a modified form of fish lure constructed in accordance with this invention and forming another embodiment thereof.
Figure 7:
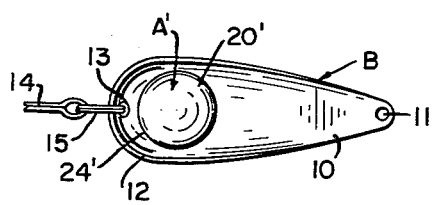
FIG. 7 is a bottom plan view of the fish lure of FIG. 6.

In the modified form of the invention shown in FIGS. 6 and 7, instead of mounting the attachment on the convex or upper surface of body B, as in FIGS. 1 to 5, an attachment A' is mounted on the concave surface or underside of the body B. It will be noted that the body B of FIGS. 6 and 7 may be of essentially the same shape and construction as the body B of FIGS. 1 to 5 and again, for purposes of illustration, is of generally spoon-shaped configuration. The attachment A' is constructed and arranged so as to produce vibration and noise in essentially the same manner as described previously, and thus includes a dome 20' adapted to enclose one or more sound producing particles, such as a ball, and a stem 21 adapted to engage hole 22 in body B. The rim 24' of dome 20' may have a slightly different configuration than the rim 24 of dome 20, although it will be observed from FIG. 1 that the rim 24 extends downwardly at each lateral edge while the rim 24' extends downwardly at each longitudinal edge. Thus, the same attachment can be used on either the convex or concave surface of the body, since a dome rim which fits the convex surface will generally conform to the concave surface, and vice versa, if one is positioned at 90° to the other. Of course, a slight crack may appear at opposite edges of the rim, but such a crack is unobjectionable if smaller than the diameter of the ball within the dome. However, the stem 21 of attachment A should be shorter than the stem of attachment A', since a convex surface extends into the dome at the center, whereas a concave surface extends away from the dome at the center. Thus, the attachments A and A' may be made in the same mold, if desired, with the stem for attachment A merely being cut shorter than the stem for attachment A'.

Through attachment to the underside of the body B, attachment A' may cause a slight difference from attachment A in the movement of the lure as it is moved through the water. In each form of the invention, the lure will present a different appearance to the fish and each attachment may tend to create added buoyancy of the lure and a different movement than without the attachment. With the attachment removed, the lure will act normally, since its action will not be materially affected by the hole 22.

It will be understood from the foregoing that the present invention provides a noise and vibration producing device conformable for attachment in various ways to various different types of conventional fish lures, which is effective and dependable and adds to the attractiveness of the lure without detracting materially from the originally designed characteristics thereof. In addition, the device is both attachable and detachable as desired by the fisherman, yet once attached will remain securely in position until positively released.

It will further be apparent that various changes and modifications in the construction and arrangement, as described, may be made without departing from the spirit and scope of this invention.

What is claimed is:
1. In a fish lure including a metallic body adapted to be connected with a fish line and a hook, said body having a leading portion and an elongated trailing portion which is convex on one side and concave on the other side, the improvement comprising a hollow, lightweight, hemispherical dome of smaller size than said body composed of plastic material and having an integral stem projecting centrally from the inner surface thereof, said body having a stem receiving opening in the trailing portion thereof and said stem being proportioned for engagement in tight fitting relation with said opening, the peripheral edge of said dome conforming to the contour of the corresponding trailing portion of said body so that said edge will substantially engage the surface of said body when said stem is inserted into said opening; and at least one particle loosely contained between said dome and said body and adapted to produce noise and vibration as said lure is moved through the water.

2. In a fish lure as defined in claim 1, wherein said dome is on the convex side of said body and the peripheral edge of said dome corresponds to the surface configuration of said convex side of said body.

3. In a fish lure as defined in claim 1, wherein said dome is mounted on the concave side of said body and the peripheral edge thereof corresponds to the surface of said concave side of said body.

4. A fish lure comprising a relatively thin, elongated body having a convex surface on one side and a concave surface on the other side and also having an aperture therethrough; a hollow, generally hemispherical shell including a stem extending centrally from the interior thereof and having a peripheral edge which is convex on two opposite sides and concave on the other two opposite sides, whereby substantially the entire edge of said shell is adapted to engage either said convex surface or said concave surface when said stem is disposed in said aperture; and means loosely contained in said shell for producing noise and vibration as said lure is moved through the water.

5. A fish lure comprising a relatively thin, elongated body including a top convex surface and a bottom concave surface and having an aperture therein; a hollow, generally hemispherical shell having a lesser diameter than the lateral dimension of said body and having a peripheral edge which is convex on two opposite sides and concave on the other two opposite sides, whereby said edge is adapted to engage said convex surface of said body when said shell is mounted on the bottom side of said body, and said shell including a stem extending centrally from the interior thereof and disposed in said aperture; and a ball disposed in said shell, having a diameter at least as great as the thickness of said body, for producing noise and vibration as said lure is moved through the water.

References Cited in the file of this patent

UNITED STATES PATENTS

| | | |
|---|---|---|
| 337,971 | McLaughlin | Mar. 16, 1886 |
| 841,429 | Passage | Jan. 15, 1907 |
| 2,008,004 | Catarau | July 16, 1935 |
| 2,205,472 | Fagerholm | June 25, 1940 |
| 2,270,487 | Withey | Jan. 20, 1942 |
| 2,613,471 | Traycik | Oct. 14, 1952 |
| 2,758,408 | Murphy et al. | Aug. 14, 1956 |